June 25, 1963 A. F. WEBER 3,095,027
PNEUMATIC TIRE
Filed Oct. 12, 1959 2 Sheets-Sheet 1

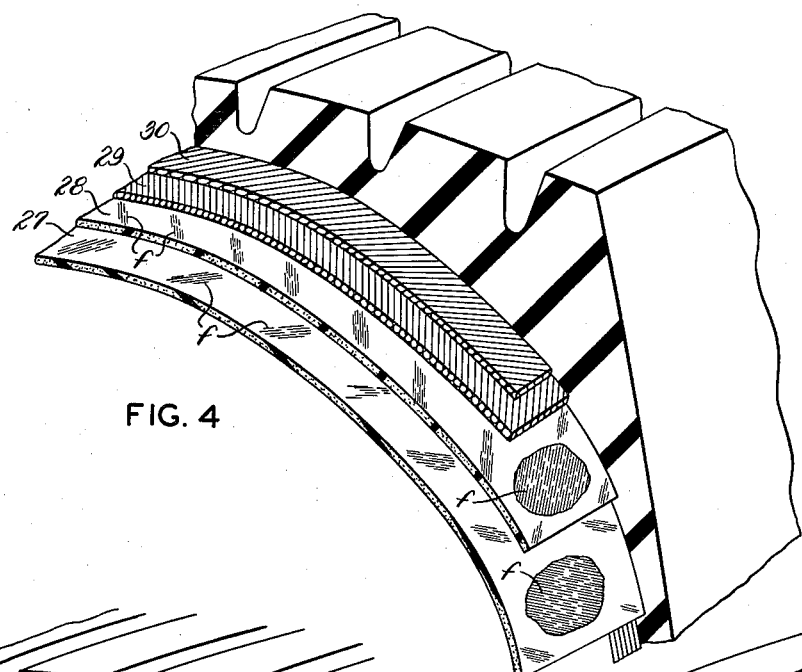
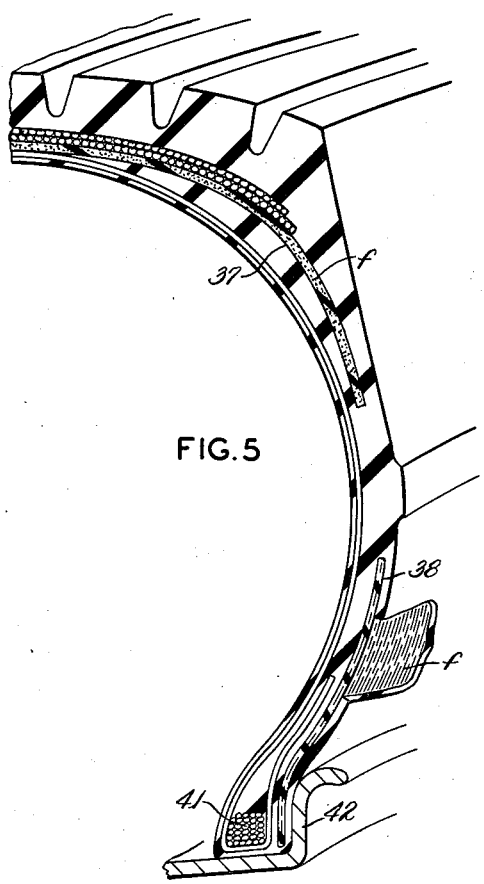
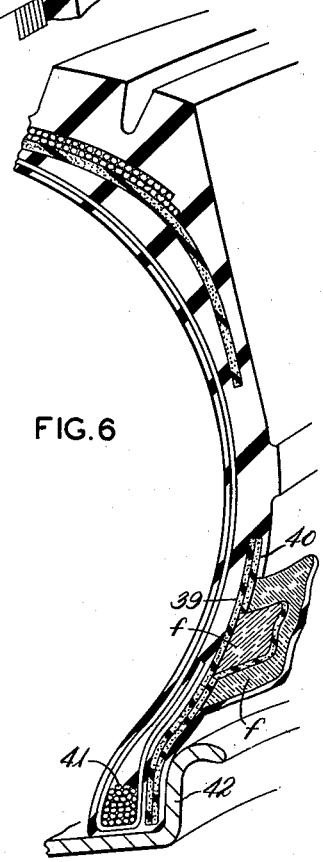

United States Patent Office 3,095,027
Patented June 25, 1963

3,095,027
PNEUMATIC TIRE
Arthur Frederick Weber, Akron, Ohio, assignor to The Firestone Tire & Rubber Company, Akron, Ohio, a corporation of Ohio
Filed Oct. 12, 1959, Ser. No. 845,855
5 Claims. (Cl. 152—355)

This invention relates to pneumatic tires and more particularly to wire tires having a construction which provides a high degree of dimensional stability to the tread.

Essentially the invention comprises a tire construction in which a high degree of tire stability and improved handling is provided by two tread plies or layers of wire fabric, with the wire cables of one ply extending at equal and opposite angles to those of the other ply, in combination with additional layers of fiber-reinforced rubber in which the majority of the reinforcing fibers are oriented to lie in a direction parallel to each other.

All of these plies, the two wire plies and the fiber-reinforced material, cooperate to produce a tire which has a high degree of dimensional stability, holding to a minimum the scuffing, chafing and flexing which tends to take place to a marked degree in the operation of conventional tires. As a result, the tire of the present invention has a long life and delivers low cost mileage.

The oriented fiber material, in addition to cooperating with the other plies to produce the desired dimensional stability in the tread also cooperates with the body of the tire to reinforce it and to impart to the tire stabiliy and good handling and steering characteristics, which otherwise tends to be lacking in such tires.

The tires embodying the invention are easy and economical to manufacture, they require no special manufacturing methods and they can be readily shaped and vulcanized.

These advantages and other objects and advantages of the invention will be more readily apparent from a description of several forms of the invention, reference being had to the accompanying drawings in which:

FIGURE 4 is a view similar to FIGURE 2, showing a modification of the invention in which the direction of the orientation in one fiber-reinforced ply extends transversely to the direction of orientation in the other fiber-reinforced ply;

FIGURE 5 is a fragmentary sectional view of one sidewall of a tire showing another modification, embodying oriented fiber tread ply material and oriented fiber material in the sidewall and bead area of the tire; and FIGURE 6 is a view similar to FIGURE 5 showing yet another modification embodying oriented fiber ply material in the tire sidewall area.

Figure 1:
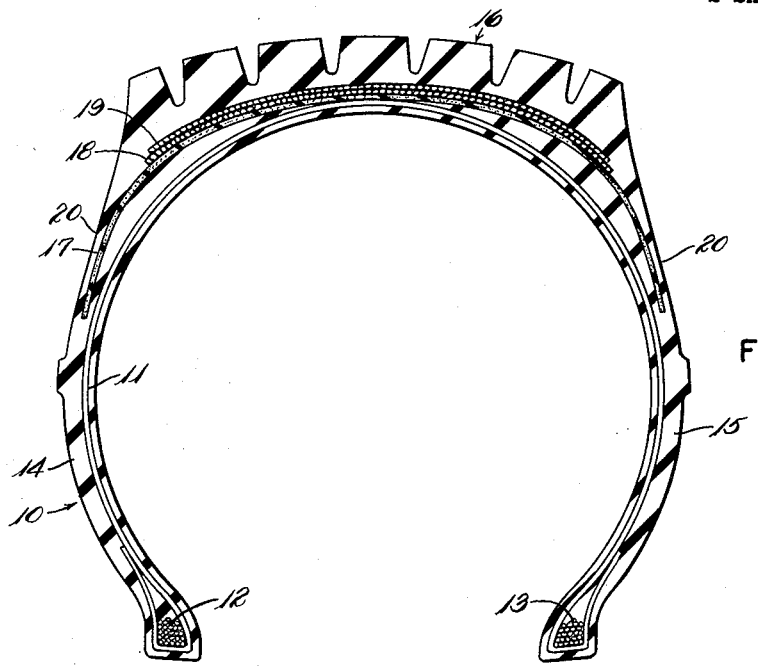
FIGURE 1 is a sectional view, taken in a radial plane, of a tire embodying the invention.
Figure 2:
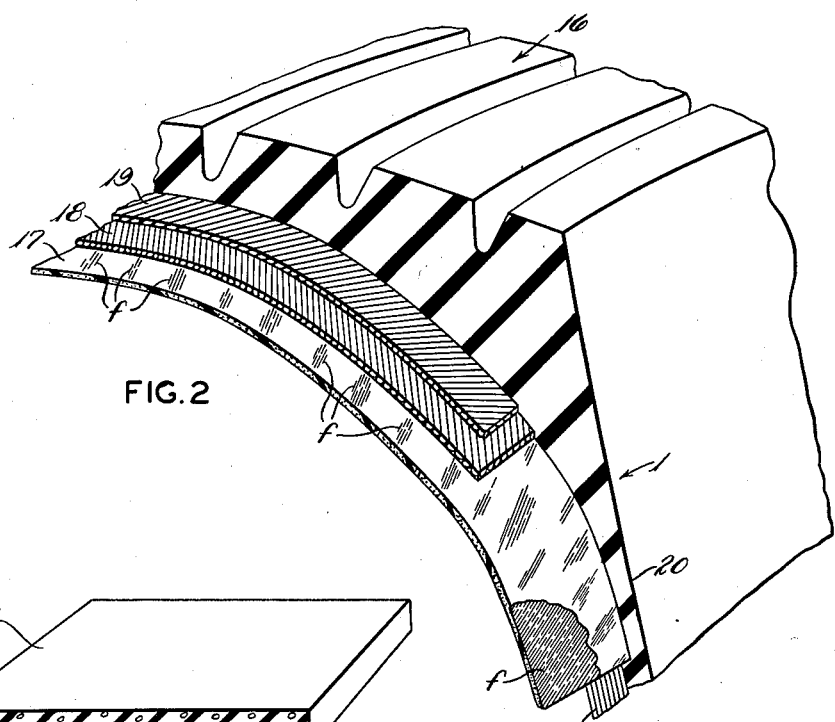
FIGURE 2 is an enlarged, fragmentary perspective view, in section, showing in more detail the construction of the tire of FIGURE 1.

The invention is described with reference to FIGURE 1 as embodied in a 10.00–20 highway truck tire, but it will be apparent that it will be useful in other types of tires both for highway and off-the-road use and in tires for other vehicles and other conditions and types of service. Such a tire, which is indicated generally at 10, comprises a single body ply 11 of wire cables which extend at 0° to the rolling axis of the tire, the ends of which are wrapped about and anchored to inextensible cores to form the beads indicated at 12 and 13, respectively. Sidewalls 14 and 15 and a tread portion 16 complete the tire.

A high degree of dimensional stability is imparted to the tread portion 16 by three tread plies indicated, respectively, at 17, 18 and 19, two of which are substantially the same width as the tread portion. The innermost tread ply 17 lies immediately adjacent the crown portion of body ply 11 and consists of rubber reinforced with oriented fibers $f$ which will be described in more detail later. The outer plies 18 and 19 are wire fabric tread plies in which the wire cables of each ply are parallel to each other and extend at angles within a range of 60° to 80°, and preferably at an angle of about 70° to the rolling axis of the tire. The cables of ply 18 extend oppositely to and cross those of ply 19.

In this particular example, the tread ply 17 is substantially the same gauge as the wire plies 18 and 19, the gauge being about 0.080 inch thick, and the rubber fiber tread ply 17 has a modulus of about 1300 p.s.i. at 20% elongation. Obviously the gauge of tread ply 17 and the modulus and other characteristics of the rubber compound will vary depending upon the tire and the service to which it will be subjected.

The ply 17 has a width substantially greater than that of the other tread plies, so that the ends thereof extend into the tire shoulder area and upper sidewall area 20 of the tire. A very substantial increase in tire stability is obtained by utilizing a ply which extends past the tire shoulder and a substantial distance along the radial height of the tire. Plies extending between 25 and 35% of the tire height have been found useful, but a ply which extends about 30% of the radial tire height is preferable.

Figure 3:
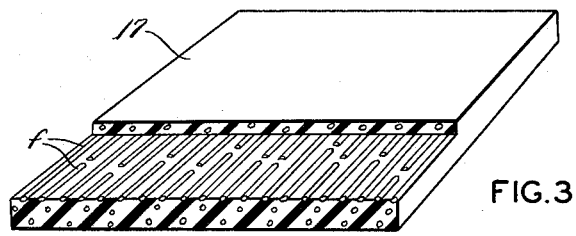
FIGURE 3 is an enlarged, somewhat diagrammatic perspective view showing a portion of the oriented fiber material which comprises one of the tread plies of the tire of FIGURES 1 and 2.

The ply 17 is reinforced by the fibers $f$ which, in this particular instance, are of nylon, the majority of which are oriented to lie parallel to each other and to extend at an angle within a range of 0°–30° to the rolling axis of the tire. In this example about 90% and more of the nylon fibers are oriented to lie parallel to each other in the same direction, see FIGURE 3, while the remainder of the fibers are somewhat less oriented. The required degree of orientation is conveniently produced by conventional milling and calendaring operations. The nylon fibers range in denier from about 1½ to 6 and range in length from about 1 to 1¼ inches and consist of about 2–5% by weight of the tread ply material.

Fibers other than nylon may be used to advantage, for example, fibers such as cotton, rayon, dacron, glass fibers, saran, polypropylene, polyethylene, steel or other suitable metal fibers may also be used. For example, excellent results will be obtained if the rubber ply 17 is reinforced with steel fibers in the order of about 0.0059 inch in gauge and about ⅞ inch in length.

In another form of the invention, as shown in FIGURE 4, the innermost tread plies 27 and 28 are reinforced with fibers $f$ like the ply 17 of the tire of FIGURE 1, while the wire tread plies 29 and 30 are identical to and correspond respectively to plies 18 and 19. However, in plies 27 and 28, respectively, the directions of orientation of the fiber extend at angles of approximately 45° to the rolling axis of the tire, and the plies are placed so that the directions of orientation cross. In such case, the fibers of the crossed plies will reinforce the body to produce maximum stability in the tire body as well as in the tread, and will materially reduce any tendency of the body ply to crack between the body cables in the crown of the tire.

In the modification of the invention illustrated in FIGURE 5, a tread ply 37, reinforced with oriented fibers $f$, is used as in FIGURE 1. In addition, a stabilizer pad 38 reinforced with oriented fibers $f$ is provided under the sidewall and extending into the bead area 41.

The direction of orientation of this stabilizer pad may extend substantially parallel to the 0° direction of the body ply, such as shown in FIGURE 5.

Alternatively, as shown in FIGURE 6, two stabilizer pads 39 and 40 may be used, the fibers being usefully oriented to form angles in the range of from 30°–60° or, preferably, an angle of about 45°, with the radical plane of the tire with the fiber orientation in one ply crossing the orientation in the other ply at an angle.

It has been found useful to extend these stabilizer pads from the bead region upward into the sidewall area for a distance of between 15 and 45% of the radial height of the tire; it is preferable, however, to extend the pads about 30% upward into the tire sidewall. In this case, the pads impart improved tire handling characteristics and additional stability to the sidewalls of the tire, reduce fatigue and prevent separation of the ply material within the tire, and prevent excessive chafing and tire damage due to roll-over of the tire sidewall onto the rim flange 42.

While the several forms of the invention have been described by way of example in connection with a tire comprising a wire cable body ply, with the cables extending at an angle of 0°, the invention can be practiced with tires of differing body constructions and characteristics. For example, the body ply need not be of wire cable; it may be of any suitable textile fabric. One or more body plies may be used, if desired, and the bias angle of the wire cables or textile cords of the body plies may extend not only at 0° but also at any of the other conventional bias angles.

Also, in the several forms of the invention just described, the fiber-reinforced plies are described as being located immediately adjacent to and outside the outermost body ply. It will be apparent that such plies may also be located, with advantage, either between or beyond ply layers. In some cases, the fiber-reinforced ply may, for example, be located inside of the body ply or plies, or between the body plies if more than one body ply is present, or outside the wire tread plies.

Also, with varying demands in service and with different types of tires, the location of the sidewall stabilizer pads, while still being under the tire sidewall, can be changed so that the stabilizer may be located between the body ply and its turned-up end, or between the turned-up body ply end and a chafer strip.

What is claimed is:

1. A pneumatic tire having a radial cord body and a tread ply assembly comprising three individual tread plies arranged radially inwardly of the tread surface of said tire, two of said individual tread plies of said assembly comprising rubbery material reinforced with parallel cords of substantially non-extensible material extending continuous from edge to edge of said tread plies at acute angles to the rolling axis of said tire and with the cords of one of said two tread plies crossing the cords of said other tread ply, the third tread ply constituting the exterior layer of said tread ply assembly and comprising elastomeric material having dispersed therein discontinuous, individual, discrete fibers, the majority of which are oriented in a single direction, the direction of orientation extending at an angle to the cords of each of said other two tread plies, said third tread ply extending beyond the shoulders of said tire and into the sidewalls thereof a sufficient amount to provide stability to said radial cord tire body.

2. A pneumatic tire as in claim 1, in which said oriented fibers comprise metallic elements.

3. A pneumatic tire as in claim 1, in which said oriented fibers comprise mineral elements.

4. A pneumatic tire having a radial cord body and a tread ply assembly comprising a plurality of individual tread plies arranged radially inwardly of the tread surface of said tire, two of said individual tread plies of said assembly comprising rubbery material reinforced with parallel cords of substantially non-extensible material extending continuous from edge to edge of said tread plies at acute angles to the rolling axis of said tire and with the cords of one of said two tread plies crossing the cords of said other tread ply, and two other tread plies constituting the exterior layer of said tread ply assembly and comprising elastomeric material having dispersed therein discontinuous, individual, discrete fibers, the majority of which are oriented, within each ply, in a single direction, the directions of orientation in said other tread plies extending at an angle to each other, and at an angle to the cords of each of said other two tread plies, said other tread plies extending beyond the shoulders of said tire and into the sidewalls thereof a sufficient extent to provide stability to said radial cord tire body.

5. A pneumatic tire as in claim 4, in which the directions of orientation of the fibers of said two other tread plies extend at about 45° to the rolling axis of said tire.

References Cited in the file of this patent

UNITED STATES PATENTS

| 1,117,994 | Freeman | Nov. 24, 1914 |
| 1,214,670 | Geer | Feb. 6, 1917 |
| 2,006,315 | Hopkinson | June 25, 1935 |
| 2,013,553 | Day | Sept. 3, 1935 |
| 2,056,012 | Madge et al. | Sept. 29, 1936 |
| 2,348,350 | McKelvey | May 9, 1944 |
| 2,493,614 | Bourdon | Jan. 3, 1950 |
| 2,498,859 | Lessig | Feb. 28, 1950 |
| 2,501,372 | Benson | Mar. 21, 1950 |
| 2,960,139 | Engstrom et al. | Nov. 15, 1960 |
| 3,018,814 | Saint-Paul | Jan. 30, 1962 |